United States Patent
Fujimori et al.

(10) Patent No.: US 8,747,614 B2
(45) Date of Patent: Jun. 10, 2014

(54) CONDUCTIVE ARAMID PAPER AND METHOD FOR PRODUCING SAME

(75) Inventors: Tatsushi Fujimori, Chiyoda-ku (JP); Shinji Naruse, Chiyoda-ku (JP)

(73) Assignee: Dupont Teijin Advanced Papers (JAPAN), Ltd., Tokyo (JP)

(*) Notice: Subject to any disclaimer, the term of this patent is extended or adjusted under 35 U.S.C. 154(b) by 0 days.

(21) Appl. No.: 14/009,808

(22) PCT Filed: Mar. 27, 2012

(86) PCT No.: PCT/JP2012/057968
§ 371 (c)(1),
(2), (4) Date: Oct. 4, 2013

(87) PCT Pub. No.: WO2012/137631
PCT Pub. Date: Oct. 11, 2012

(65) Prior Publication Data
US 2014/0034256 A1    Feb. 6, 2014

(30) Foreign Application Priority Data
Apr. 7, 2011 (JP) ................. 2011-085065

(51) Int. Cl.
*D21F 11/00*    (2006.01)

(52) U.S. Cl.
USPC .......................................... 162/138

(58) Field of Classification Search
USPC .......... 162/138, 125, 129, 135; 428/285, 414; 427/58; 429/209, 247; 442/414, 149, 442/377
See application file for complete search history.

(56) References Cited

U.S. PATENT DOCUMENTS

| | | |
|---|---|---|
| 5,316,839 A | 5/1994 | Kato et al. |
| 2006/0266486 A1 | 11/2006 | Levit |
| 2007/0137818 A1 | 6/2007 | Levit et al. |
| 2010/0206502 A1 | 8/2010 | Levit |
| 2010/0212851 A1 | 8/2010 | Levit et al. |

FOREIGN PATENT DOCUMENTS

| | | |
|---|---|---|
| JP | 51-47103 | 4/1976 |
| JP | 57-115702 | 7/1982 |
| JP | 4-080025 | 3/1992 |
| JP | 5-295691 | 11/1993 |
| JP | 11-020083 | 1/1999 |
| JP | 2008-542557 | 11/2008 |
| JP | 2009-521615 | 6/2009 |

*Primary Examiner* — Mark Halpern
(74) *Attorney, Agent, or Firm* — Wenderoth, Lind & Ponack, L.L.P.

(57) ABSTRACT

Provided is a conductive aramid paper comprising an aramid short fiber, an aramid fibrid, and a conductive filler, and having a density of 0.45 to 1.10 g/cm$^3$, a tensile strength of 2.5 kN/m or higher, and a surface resistivity of $1.0 \times 10^1$ to $5.0 \times 10^2 \Omega/\square$. This conductive aramid paper has an electric field relaxation function and an antistatic function enough to be favorably used as a material for reducing corona in rotating electrical machines, and also antistatic components for electrical and electronic devices, and sub-materials for processing or assembling any of these.

5 Claims, No Drawings

CONDUCTIVE ARAMID PAPER AND METHOD FOR PRODUCING SAME

This application is a 371 of PCT/JP2012/057968 filed 27 Mar. 2012.

TECHNICAL FIELD

The present invention relates to a conductive aramid paper useful as antistatic materials in the fields of rotating electrical machines (power generators and motors) and transformers and as antistatic materials for electrical and electronic devices, in particular, useful as a material for preventing corona generation in rotating electrical machines, an antistatic component in electrical and electronic devices, and the like. The present invention also relates to a method for producing the conductive aramid paper.

BACKGROUND ART

In a large rotating electrical machine, a large voltage of about several kilovolts to ten and several kilovolts is almost always applied between a coil portion which is a conductor and a slot insulation material which is an insulator. When partial discharge occurs at this portion, the insulation is damaged by ionized molecules, so that the lifetime of the rotating electrical machine is remarkably shortened. In particular, since the thickness of the insulation layer is reduced with the recent miniaturization of devices, and in turn the electric field intensity increases, the possibility of such partial discharge tends to increase. At the same time, the increase in generated (output) voltage and current with the increase in capacity can also be regarded as a factor of causing the above-described problem. Hence, in rotating electrical machines, particularly, large rotating electrical machines, a material capable of relaxing an electric field generated between a coil and an insulation material is extremely important for securing the reliability of an insulation system capable of reducing the generation of corona.

Conventionally, a method in which a conductive coating material is applied onto or impregnated into a topmost surface of an insulation layer is widely employed as a method for relaxing an electric field in a rotating electrical machine to which a high voltage is applied. However, this method has the following problems: the workability during production processes of devices is not necessary good; the influence of the vaporization of a solvent on the working environment is non-negligible; and the operation requires a long time. Moreover, this method has a problem in terms of the reproducibility of the conductivity (resistance value).

A method for solving these problems may be a method in which a conductive thin sheet material (for example, paper, film, tape, or the like) is wound or inserted. Particularly, in electrical and electronic devices to which a high voltage is applied, such as large rotating electrical machines, the temperatures of the devices increase greatly, and hence a highly heat-resistant material is required.

On the other hand, highly heat-resistant aramid papers, which serve as electric insulators or thin sheet structure materials, have been widely used as electric insulating materials in the above-described fields of rotating electrical machines (power generators and motors) and transformers and for electrical and electronic devices. The use of an aramid paper as a material for relaxing an electric field has been also examined by providing some conductivity to the aramid paper.

Patent Literatures 1 and 2 disclose papers which use an aramid fibrid with a carbon fiber or a metal fiber. However, each of these papers is not intended to be a material for relaxing an electric field described above, and hence is unsatisfactory in terms of conductivity and mechanical strength.

Moreover, Patent Literature 3 discloses a conductive aramid paper which is constituted of an aramid short fiber, an aramid fibrid, and a conductive filler such as a carbon fiber, and which has a low density and a high strength. However, in the method described in this patent, a sheet formed by wet paper making is not densified after the formation. Hence, although the conductive aramid paper has a high resin-impregnating ability, it is difficult to form the conductive aramid paper in a small thickness by this method, in other words, space-saving is hampered. In addition, since the surface is not smoothed, this conductive aramid paper has such a problem that the paper tends to be fuzzed when installed in an electrical device or on a conductor, for example.

CITATION LIST

Patent Literatures

Patent Literature 1: Japanese Patent Application Publication No. Sho 51-47103
Patent Literature 2: Japanese Patent Application Publication No. Sho 57-115702
Patent Literature 3: International Application Japanese-Phase Publication No. 2008-542557

SUMMARY OF INVENTION

An object of the present invention is to provide a conductive aramid paper having an electric field relaxation function and an antistatic function, which can be favorably used as a material for reducing corona in rotating electrical machines, antistatic components for electrical and electronic devices, and sub-materials for processing or assembling any of these.

Another object of the present invention is to provide a conductive aramid paper having an excellent antistatic function, improved mechanical characteristics, and improved fuzz-resistance.

Still another object of the present invention is to provide a method for efficiently producing the above-described conductive aramid paper.

The present inventors have conducted intensive studies to solve the above-described problems, and consequently found that the above-described problems can be solved as follows. Specifically, a conductive aramid paper which has a density of 0.45 to 1.10 g/cm$^3$, a tensile strength of 2.5 kN/m or higher, and a surface resistivity of $1.0 \times 10^1$ to $5.0 \times 10^2 \Omega/\square$ is prepared by appropriately combining an aramid short fiber, an aramid fibrid, and a conductive filler. The thus prepared conductive aramid paper has a sufficient effect on the electric field relaxation, an excellent antistatic function, and improved mechanical characteristics. Hence, the above-described problems can be solved by this conductive aramid paper. This finding has led to the completion of the present invention.

Specifically, a first invention of the present application provides a conductive aramid paper comprising: an aramid short fiber; an aramid fibrid; and a conductive filler, wherein the conductive aramid paper has a density of 0.45 to 1.10 g/cm$^3$, a tensile strength of 2 kN/m or higher, and a surface resistivity of $1.0 \times 10^1$ to $5.0 \times 10^2 \Omega/\square$.

A second invention of the present application provides the conductive aramid paper according to the first invention, which has a thickness of 20 to 100 μm.

A third invention of the present application provides the conductive aramid paper according to the first or second invention, wherein the aramid constituting the aramid short fiber and the aramid fibrid is poly(meta-phenylene isophthalamide).

A fourth invention of the present application provides the conductive aramid paper according to any one of the first to third inventions, wherein the conductive filler is a carbon fiber.

A fifth invention of the present application provides a method for producing the conductive aramid paper according to any one of the first to fourth inventions, the method comprising: mixing an aramid short fiber, an aramid fibrid, and a conductive filler in water; forming a sheet from the mixture by a wet paper making method; and then hot-pressing the obtained sheet between a pair of metal rolls at a temperature of 330° C. or above.

DESCRIPTION OF EMBODIMENTS

Hereinafter, the present invention will be described in detail.

[Aramid]

In the present invention, an aramid means a linear polymeric compound in which 60% or more of amide linkages are directly bonded to aromatic rings. Examples of such an aramid include poly(meta-phenylene isophthalamide), copolymers thereof, poly(para-phenylene terephthalamide), copolymers thereof, co-poly(para-phenylene-3,4'-diphenyl ether terephthalamide), and the like. For example, these aramids are industrially produced based on a condensation reaction between an aromatic acid dichloride and an aromatic diamine(s) by a solution polymerization method, a two-step interfacial polymerization method, or the like. The form of the aramid used in the present invention is not particularly limited, and the aramid is preferably in the form of an aramid fibrid, an aramid short fiber, a fibrillated aramid, or the like.

[Aramid Short Fiber]

The aramid short fiber used in the present invention may be one obtained by cutting a fiber made of an aramid into pieces having predetermined lengths. Examples of such a fiber include those available under the trade names of "TEIJIN-CONEX (registered trademark)" and "TECHNORA (registered trademark)" of Teijin Techno Products Limited, "NOMEX (registered trademark)" and "KEVLAR (registered trademark)" of DuPont, "Twaron (registered trademark)" of Teijin Aramid BV, and the like, but are not limited thereto.

The aramid short fiber can preferably have a fineness in a range from 0.05 dtex inclusive to 25 dtex exclusive. A fiber having a fineness of less than 0.05 dtex is not preferable, because aggregation tends to occur during the production by a wet method (described later). Meanwhile, a fiber having a fineness of 25 dtex or more is not preferable because of the following reason. Specifically, such a fiber has an excessively large fiber diameter. Hence, for example, in a case where an aramid short fiber having a completely circular shape and a density of 1.4 g/cm$^3$ has a diameter of 45 microns or larger, problems may occur such as decrease in aspect ratio, reduction of the mechanical reinforcing effect, and poor uniformity of the conductive aramid paper. If the uniformity of the conductive aramid paper is poor, the electrical conductivity varies within the paper, so that the desired electric field relaxation function and the desired antistatic function may be exhibited insufficiently.

The length of the aramid short fiber can be selected in a range of 1 mm inclusive to 25 mm exclusive. If the length of the short fiber is less than 1 mm, mechanical characteristics of the conductive aramid paper deteriorate. On the other hand, a short fiber having a length of 25 mm or more tends to undergo "entanglement", "bundling", and the like during production of a conductive aramid paper by a wet method described later, and hence tends to cause defects. Therefore, either case is not preferable.

[Aramid Fibrid]

The aramid fibrid used in the present invention is film-like fine particles made of an aramid, and may also be referred to as an aramid pulp. Examples of a method for producing the aramid fibrid include those described in Japanese Examined Patent Application Publication Nos. Sho 35-11851 and Sho 37-5732, and the like. The fibrid have a property of being formed into paper as in the case of ordinary wood (cellulose) pulp. Hence, after the fibrid is dispersed in water, the fibrid can be formed into a sheet-like shape by a paper machine. In this case, a so-called beating/refining treatment can be conducted in order to keep a quality suitable for paper making. This beating/refining treatment can be conducted by a disk refiner, a beater, or other devices having a mechanical cutting effect for treating paper making raw materials. In this operation, the change in the form of the fibrid can be monitored based on the freeness specified in JIS P8121. In the present invention, the freeness of the fibrid of the organic compound subjected to the beating/refining treatment is preferably in a range from 10 to 300 cm$^3$ (Canadian standard freeness). A fibrid having a freeness above this range may leads to decrease in strength of the nonwoven fabric sheet formed from the fibrid. On the other hand, when an attempt is made to obtain a freeness below 10 cm$^3$, the efficiency of utilization of the inputted mechanical power is lwoered, and the amount of treatment per unit time decreases in many cased. Moreover, the fibrid becomes excessively fine, so that the so-called binder function tends to decrease. Hence, no significant advantage is seen by obtaining a freeness smaller than 10 cm$^3$.

[Conductive Filler]

The conductive filler used in the present invention may be a conductive fibrous or fine-particulate (powdery or flake-like) substance ranging widely from a conductor having a volume resistance of approximately $10^{-1}$ Ω·cm or less to a semiconductor having a volume resistance of approximately $10^{-1}$ to $10^8$ Ω·cm. Examples of the conductive filler include homogeneous conductive materials such as metal fibers, carbon fibers, and carbon black; materials each obtained by mixing a conductive material and a non-conductive material, which exhibit conductivity as a whole, such as metal-plated fibers, fibers blended with metal powders, or fibers blended with carbon black; and the like. However, the conductive filler is not limited to these examples. Of these examples, it is preferable to use a carbon fiber in the present invention.

The carbon fiber used in the present invention is preferably one obtained by carbonizing a fibrous organic substance by high-temperature calcination under an inert atmosphere. In general, carbon fibers can be roughly classified into those obtained by calcining a polyacrylonitrile (PAN) fiber, and those obtained by spinning pitch followed by calcination. Besides these carbon fibers, some carbon fibers are produced by spinning a resin such as rayon or phenol followed by calcination. Such carbon fibers can also be used in the present invention. Prior to the calcination, it is also possible to perform an oxidative cross-linking treatment using oxygen or the like on the carbon fiber for preventing the carbon fiber from being cut due to melting during the calcination.

The fineness of the carbon fiber used in the present invention is preferably in a range from 0.5 to 10 dtex. In addition, the fiber length is selected in a range from 1 mm to 20 mm.

Regarding the selection of the conductive filler, it is more preferable to use a material which has a high electrical conductivity, and which can be dispersed favorably in a wet paper making method described later. In addition, when a carbon fiber is selected, it is further preferable to select one having a high strength and being resistant to embrittlement. By selecting such a material, it is possible to obtain a conductive aramid paper having the features of the present invention, i.e., a high strength, an electrical conductivity suitable for a material for relaxing an electric field or an antistatic material, and the density in the specific range achieved by hot-pressing.

[Conductive Aramid Paper]

The conductive aramid paper of the present invention is characterized by being constituted of the above-described aramid short fiber, aramid fibrid, and conductive filler.

The content of the aramid short fiber is 5 to 60% by weight, preferably 10 to 55% by weight, and more preferably 20 to 50% by weight relative to the total weight of the conductive aramid paper of the present invention, but is not limited thereto. In general, if the content of the aramid short fiber is less than 5% by weight, the mechanical strength of the conductive aramid paper tends to decrease. If the content of the aramid short fiber exceeds 60% by weight, the mechanical strength also tends to decrease, because the content of the aramid fibrid decreases.

The content of the aramid fibrid is 30 to 80% by weight, preferably 35 to 70% by weight, and more preferably 40 to 65% by weight relative to the total weight of the conductive aramid paper of the present invention, but is not limited thereto. In general, if the content of the aramid fibrid is less than 30% by weight, the mechanical strength of the conductive aramid paper tends to decrease. If the content of the aramid fibrid exceeds 80% by weight, the freeness decreases in the production by a wet method (described later), increasing the possibility of occurrences of poor uniformity of the conductive aramid paper and the like.

In addition, in order to obtain a paper having a surface resistivity in a range of $1.0 \times 10^1$ to $5.0 \times 10^2 \Omega/\square$, which is a feature of the present invention, the content of the conductive filler is preferably 1 to 30% by weight, more preferably 2 to 20% by weight, and further preferably 3 to 10% by weight relative to the conductive aramid paper of the present invention. If the content of the conductive filler is less than 1% by weight, it is difficult to obtain a surface resistance value within the above-described range. Meanwhile, if the content of the conductive filler exceeds 30% by weight, in general, the mechanical strength of the conductive aramid paper tends to decrease, and it becomes difficult to produce a homogeneous paper without using a complicated method.

The density of the conductive aramid paper of the present invention is a value (basis weight/thickness) calculated as specified in JIS C 2300-2, and is characterized by taking a value in a range from 0.45 to 1.10 g/cm$^3$. A density of less than 0.45 g/cm$^3$ is not preferable, because it is necessary to increase the basis weight in order to increase the mechanical strength, and this result in increase in the thickness. Meanwhile, a density exceeding 1.10 g/cm$^3$ is not preferable, because pores in the paper decrease, and hence such a conductive aramid paper is unstable, for example, in the application where the conductive aramid paper is used after being impregnated with a resin. The density of the conductive aramid paper of the present invention is preferably 0.50 to 1.00 g/cm$^3$.

The tensile strength of the conductive aramid paper of the present invention is characterized by being 2.5 kN/m or higher, and preferably 3.0 kN/m or higher. If the tensile strength is less than 2.5 kN/m, breakage, tearing, or the like may occur, for example, when a tape prepared by using the paper of the present invention is wound around a coil conductor or the like by using an automatic tape winder. The tensile strength of the conductive aramid paper of the present invention is more preferably 3.5 to 10.0 kN/m.

The conductive aramid paper of the present invention is characterized in that the surface resistivity is $1.0 \times 10^1$ to $5.0 \times 10^2 \Omega/\square$, preferably $5.0 \times 10^1$ to $5.0 \times 10^2 \Omega/\square$, and more preferably $5.0 \times 10^1$ to $4.0 \times 10^2 \Omega/\square$. If the surface resistivity is less than $1.0 \times 10^1 \Omega$, it is necessary to increase the content of the conductive filler in order to obtain such a surface resistivity, and hence it becomes difficult to obtain a sufficient mechanical strength, and it becomes difficult to cause a desired electric field relaxation function to be exhibited. Hence, a surface resistivity of less than $1.0 \times 10^1 \Omega$ is not preferable. A surface resistivity exceeding $5.0 \times 10^2 \Omega/\square$ is not preferable, ether, because it is difficult to obtain stably a desired electric field relaxation function and a desired antistatic function.

In addition, the thickness of the conductive aramid paper is not particularly limited, and, in general, the conductive aramid paper preferably has a thickness in a range from 20 μm to 100 μm, and more preferably 30 to 80 μm. If the thickness is less than 20 μm, the mechanical characteristics decreases, so that problems associated with handling such as transfer during the production step tend to occur. On the other hand, if the thickness exceeds 100 μm, it tends to be difficult to achieve space-saving, for example, when the conductive aramid paper is installed on an electrical device or a conductor. Note that the basis weight of the conductive aramid paper is preferably 10 to 110 g/m$^2$.

[Production of Conductive Aramid Paper]

In general, the conductive aramid paper of the present invention having the performance as described above can be produced by a method in which the above-described aramid short fiber, aramid fibrid, and conductive filler are mixed with each other, and then a sheet is formed therefrom. Specific examples of employable methods include a method in which the above-described aramid short fiber, aramid fibrid, and conductive filler are dry blended with each other, and then a sheet is formed by using an air stream, a method in which the aramid short fiber, aramid fibrid, and conductive filler are dispersed in a liquid medium and mixed with each other, then a sheet is formed by discharging the dispersion onto a liquid permeable support, for example, a screen or a belt, and the liquid is removed from the sheet followed by drying, and the like. Of these methods, the so-called wet paper making method is preferably selected in which water is used as the medium.

In the wet paper making method, aqueous slurries of at least the aramid short fiber, aramid fibrid, and conductive filler, respectively, or an aqueous slurry of a mixture thereof is fed to a paper machine and dispersed, followed by water-draining, water-squeezing, and drying operations, and then the paper is wound as a sheet. As the paper machine, for example, a Fourdrinier paper machine, a cylinder paper machine, a inclined-type paper machine, a combination paper machine in which any one of these paper machines are combined, or the like can be used. In the case of the production using the combination paper machine, it is also possible to obtain a composite sheet comprising multiple paper layers by forming sheets from aqueous slurrys having different mixing ratios and integrating these sheets. If necessary, additives such as a dispersibility improver, a defoamer, a strengthening agent can be used in the wet paper making. Moreover, when the conductive filler is a particulate material, an acrylic resin, a fixing agent, a polymer flocculant, and the like may be added. However, attention should be paid when these additives are used, so that these additives do not impair the objects of the present invention.

In addition to the above-described components, other fibrous components can be added to the conductive aramid paper of the present invention, as long as the objects of the present invention are not impaired. Examples of these other fibrous components include organic fibers such as polyphenylene sulfide fibers, polyetheretherketone fibers, cellulose-based fibers, polyvinyl alcohol fibers, polyester fibers, polyarylate fibers, liquid-crystal polyester fibers, polyimide fibers, polyamideimide fibers, and poly(p-phenylenebenzobisoxazole) fibers, and inorganic fibers such as glass fibers, rock wool, and boron fibers. Note that when the above-described additives and/or other fibrous components are used, the amount thereof is preferably 20% by weight or less relative to the total weight of the conductive aramid paper.

The mechanical strength of the thus obtained conductive aramid paper can be improved by, for example, hot-pressing the conductive aramid paper between a pair of flat plates or metal rolls at a high temperature and a high pressure. When metal rolls are used, the hot-pressing conditions are, for example, that the temperature is in the range from 100 to 400° C. and the linear pressure is in the range from 50 to 1000 kg/cm. In order to obtain a high tensile strength and a high surface smoothness, which are features of the conductive aramid paper of the present invention, the roll temperature is preferably 330° C. or above, and more preferably 330° C. to 380° C. Meanwhile, the linear pressure is preferably 50 to 500 kg/cm. The temperature is higher than the glass transition temperature of a meta-type aramid, and close to the crystallization temperature of a meta-type aramid. Hence, the hot-pressing at the temperature not only improves the mechanical strength, but also brings the materials constituting the conductive aramid paper into close and firm contact with each other. Thus, for example, when the conductive filler is a carbon fiber, release of the carbon fiber can be prevented. In the fields where the conductive aramid paper is processed or used, the conductive aramid paper is prevented from being attached to the skin and the like due to direct contact with the fiber or release of the fiber, and the resultant skin irritations such as an itch and a pain are reduced, so that the deterioration of the working environment can be prevented.

The above-described hot-pressing may be conducted multiple times. Moreover, in some applications, an excessive space-saving is unnecessary, but a thickness exceeding 100 μm may be required. In such a case, multiple sheet-like articles obtained by the above-described method may be stacked on each other and then hot pressed.

The conductive aramid paper of the present invention has the following excellent characteristics: (1) having moderate electrical conductivity; (2) having heat resistance and flame retardancy; (3) having a high tensile strength sufficient to be applicable to an automatic tape winder or the like; (4) having low skin irritancy; and the like. Hence, the conductive aramid paper of the present invention can be suitably used especially as a material for preventing corona generation in high-voltage large rotating electrical machines and the like, antistatic components for electrical and electronic devices, and the like.

EXAMPLES

Hereinafter, the present invention will be described more specifically based on examples. Note that these examples are merely illustrative, and the contents of the present invention are not limited to these examples at all.

[Measuring Methods]
(1) Mass per unit area, thickness, and density of sheets
These were measured in accordance with JIS C 2300-2.
(2) Tensile strength
This was measured in accordance with ASTM D-828.
(3) Surface resistivity
This was measured in accordance with ASTM D-257.
(4) Fuzz-resistance
A Gakushin-type rubbing tester described in JIS L 0849 was used. A fabric tape ("102N" manufactured by Nichiban Co., Ltd.) was attached onto the surface of a rubbing finger. With the load on the rubbing being 200 g, a center potion, having a length of 10 cm, of a test piece was rubbed 10 times only in one direction at a speed of 30 reciprocations per minutes. After the rubbing, the state of the sheet was visually evaluated based on the following criteria:
○: The test piece was not fuzzed.
Δ: The test piece was slightly fuzzed.
X: The test piece was fuzzed.

[Preparation of Raw Materials]

A fibrid of poly(meta-phenylene isophthalamide) was produced by a method using a wet precipitation apparatus constituted of a combination of a stator and a rotor described in Japanese Examined Patent Application Publication No. Sho 52-15621. The length-weighted average fiber length of the fibrid was adjusted to 0.9 mm (freeness: 200 cm$^3$) by treating the fibrid with a beating/refining machine. On the other hand, a meta-aramid fiber manufactured by DuPont (NOMEX (registered trademark), single yarn fineness: 2.2 dtex) was cut into pieces having a length of 6 mm, and used as a raw material for paper making.

Examples 1 to 4

Slurrys were prepared by dispersing the meta-aramid fibrid and the meta-aramid short fiber prepared as described above and a carbon fiber (manufactured by TOHO TENAX Co., Ltd., fiber length: 3 mm, single fiber diameter: 7 μm, fineness: 0.67 dtex, volume resistivity: $1.6 \times 10^{-3}$ Ω·cm) in water, respectively. These slurrys were mixed with each other at the blending ratios of the meta-aramid fibrid, the meta-aramid short fiber, and the carbon fiber shown in Table 1. A sheet-like article was prepared by treating each of the mixtures with a TAPPI-type manual paper machine (cross-sectional area: 325 cm$^2$). Subsequently, the obtained sheet was hot pressed between a pair of metal calender rolls at a temperature of 330° C. and a linear pressure of 150 kg/cm. Thus, each conductive aramid paper was obtained. The values of major characteristics of the thus obtained conductive aramid papers are shown in Table 1.

Example 5

A sheet-like article obtained by the same method as in Example 1 was hot pressed by a pair of metal calender rolls at a temperature of 350° C. and a linear pressure of 150 kg/cm. Thus, a conductive aramid paper was obtained. The values of major characteristics of the thus obtained conductive aramid paper are shown in Table 1.

Comparative Example 1

Slurrys were prepared by dispersing the meta-aramid fibrid and the meta-aramid short fiber prepared as described above and a carbon fiber ("TORAYCA (registered trademark)" manufactured by Toray Industries, Inc., a chopped fiber (fiber length: 6 mm, single fiber diameter: 7 μm)) in water, respectively. A sheet-like article was prepared by using these slurrys which were treated with a TAPPI-type manual paper machine (cross-sectional area: 325 cm$^2$) in the same manner as in Reference Example 2 described in Japanese Patent Application Publication No. Hei 11-20083. Subsequently, the obtained sheet was hot pressed by a pair of metal calender rolls at a temperature of 330° C. and a linear pressure of 150 kg/cm. Thus, a conductive aramid paper was obtained. The values of major characteristics of the thus obtained conductive aramid paper are shown in Table 2.

Comparative Example 2

A sheet-like article obtained by the same method as in Example 1 was brought into contact with metal rolls heated at 320° C. for 7 seconds. Thus, a conductive aramid paper was obtained. Values of major characteristics of the thus obtained conductive aramid paper are shown in Table 2.

Comparative Example 3

A sheet-like article obtained by the same method as in Example 1 was hot pressed by a pair of metal calender rolls at a temperature of 250° C. and a linear pressure of 150 kg/cm. Thus, a conductive aramid paper was obtained. The values of major characteristics of the thus obtained conductive aramid paper are shown in Table 2.

TABLE 1

| Characteristics | Unit | Ex. 1 | Ex. 2 | Ex. 3 | Ex. 4 | Ex. 5 |
|---|---|---|---|---|---|---|
| Raw material composition | % by weight | | | | | |
| m-Aramid fibrid | | 50 | 60 | 50 | 50 | 50 |
| m-Aramid short fiber | | 45 | 35 | 43 | 40 | 45 |
| carbon fiber | | 5 | 5 | 7 | 10 | 5 |
| Basis weight | g/m$^2$ | 40.0 | 40.0 | 40.0 | 40.0 | 40.0 |
| Thickness | μm | 65 | 61 | 66 | 67 | 62 |
| Density | g/cm$^3$ | 0.62 | 0.66 | 0.61 | 0.60 | 0.65 |
| Tensile strength | kN/m | 4.6 | 5.0 | 4.2 | 3.9 | 5.0 |
| Surface resistivity | Ω/□ | $1.1 \times 10^2$ | $8.9 \times 10^1$ | $8.5 \times 10^1$ | $6.9 \times 10^1$ | $7.4 \times 10^1$ |
| Fuzz-resistance | | ○ | ○ | ○ | ○ | ○ |

TABLE 2

| Characteristics | Unit | Comp. Ex. 1 | Comp. Ex. 2 | Comp. Ex. 3 |
|---|---|---|---|---|
| Raw material composition | % by weight | | | |
| m-Aramid fibrid | | 47 | 50 | 50 |
| m-Aramid short fiber | | 42 | 45 | 45 |
| carbon fiber | | 11 | 5 | 5 |
| Basis weight | g/m$^2$ | 40.0 | 40.0 | 40.0 |
| Thickness | μm | 65 | 147 | 58 |
| Density | g/cm$^3$ | 0.62 | 0.27 | 0.69 |
| Tensile strength | kN/m | 4.2 | 2.4 | 3.2 |
| Surface resistivity | Ω/□ | $7.0 \times 10^2$ | $7.5 \times 10^2$ | $5.5 \times 10^2$ |
| Fuzz-resistance | | ○ | X | Δ |

As shown in Table 1, the conductive aramid papers of Examples 1 to 5, which were the products according to the present invention, each had excellent characteristics in terms of density, strength, surface resistivity, and fuzz-resistance. In contrast, as shown in Table 2, the surface resistivity of each of the conductive aramid papers of Comparative Examples 1 to 3 took a high value, and it can be seen that the conductive aramid paper is insufficient as an intended electric field relaxation material for a rotating electrical machine to which a high voltage is applied. Moreover, in Comparative Examples 2 and 3, the fuzz-resistance was also poor. Hence, it is suggested that the raw materials will come off from the surface of the paper, for example, when the paper is wound around a coil conductor or the like by using an automatic tape winder, and this may cause insulation breakdown. Therefore, it has been found that it is effective to use any of the conductive aramid papers shown in Examples for obtaining a conductive aramid paper having a moderate electrical conductivity and being excellent in heat resistance, flame retardancy, and mechanical strength which is useful as a material for preventing corona generation in high-voltage large rotating electrical machines and the like, antistatic components for electrical and electronic devices, and the like.

What is claimed is:

1. A conductive aramid paper comprising a mixture of
   5 to 60% by weight of an aramid short fiber,
   30 to 80% by weight of an aramid fibrid, and
   1 to 30% by weight of a conductive filler,
   wherein the weight percentages are relative to the total weight of the aramid short fiber, the aramid fibrid, and the conductive filler, and
   wherein the conductive aramid paper has a density of 0.45 to 1.10 g/cm$^3$, a tensile strength of 2.5 kN/m or higher, a surface resistivity of $1.0 \times 10^1$ to $5.0 \times 10^2$ Ω/□, and a thickness of 20 to 100 μm.

2. The conductive aramid paper according to claim 1, wherein
   the aramid constituting the aramid short fiber and the aramid fibrid is poly(meta-phenylene isophthalamide).

3. The conductive aramid paper according to claim 1, wherein
   the conductive filler is a carbon fiber.

4. The conductive aramid paper according to claim 1, which is obtained by
   mixing an aramid short fiber, an aramid fibrid, and a conductive filler in water;
   forming a sheet from the mixture by a wet paper making method; and then
   hot-pressing the obtained sheet between a pair of metal rolls at a temperature of 330° C. or above.

5. A method for producing the conductive aramid paper according to claim 1, the method comprising:
   mixing an aramid short fiber, an aramid fibrid, and a conductive filler in water;
   forming a sheet from the mixture by a wet paper making method; and then
   hot-pressing the obtained sheet between a pair of metal rolls at a temperature of 330° C. or above.

* * * * *